United States Patent
Hamers et al.

(10) Patent No.: US 8,613,348 B2
(45) Date of Patent: Dec. 24, 2013

(54) OSCILLATION DAMPER HAVING A BACKPACK VALVE

(75) Inventors: Wolfgang Hamers, Juelich (DE); Andreas Feld, Duesseldorf (DE)

(73) Assignee: ThyssenKrupp Bilstein Suspension GmbH, Ennepetal (DE)

( * ) Notice: Subject to any disclaimer, the term of this patent is extended or adjusted under 35 U.S.C. 154(b) by 288 days.

(21) Appl. No.: 12/933,656

(22) PCT Filed: Mar. 19, 2009

(86) PCT No.: PCT/EP2009/002026
§ 371 (c)(1),
(2), (4) Date: Nov. 12, 2010

(87) PCT Pub. No.: WO2009/115328
PCT Pub. Date: Sep. 24, 2009

(65) Prior Publication Data
US 2011/0042174 A1 Feb. 24, 2011

(30) Foreign Application Priority Data
Mar. 20, 2008 (DE) .......................... 10 2008 015 412

(51) Int. Cl.
*F16F 9/54* (2006.01)
(52) U.S. Cl.
USPC ..................................... 188/322.2; 188/282.6
(58) Field of Classification Search
USPC ................ 188/281, 282.5, 282.6, 322.2, 318, 188/322.13, 266.6
See application file for complete search history.

(56) References Cited

U.S. PATENT DOCUMENTS

| 4,802,561 A * | 2/1989 | Knecht et al. .................. 188/318 |
| 5,735,372 A | 4/1998 | Hamilton et al. |
| 2005/0121273 A1* | 6/2005 | Hamers ...................... 188/322.2 |

FOREIGN PATENT DOCUMENTS

| DE | 39 37 795 A1 | 11/1990 |
| DE | 93 05 783 U1 | 9/1993 |
| DE | 44 04 963 A1 | 10/1994 |
| DE | 44 45 705 A1 | 6/1996 |
| DE | 195 47 910 C1 | 1/1997 |
| DE | 197 31 138 A1 | 2/1999 |
| DE | 100 62 999 B4 | 7/2002 |
| EP | 1538 366 A1 | 6/2005 |

OTHER PUBLICATIONS

International Search Report (translation thereof) dated Apr. 9, 2009 (9 pages).
German Patent Office Action, dated Nov. 25, 2008 and Applicant's Response (9 pages).

\* cited by examiner

*Primary Examiner* — Melanie Torres Williams
(74) *Attorney, Agent, or Firm* — Crowell & Moring LLP

(57) ABSTRACT

A hydraulic oscillation damper has a piston rod with a piston that is inserted into a damper tube filled with damping fluid, and divides the damper tube into first and second working chambers. First and second continuously adjustable damping valves are disposed in a common housing that is attached to the damper tube, and are connected hydraulically in parallel with the working piston. The housing has a first hydraulic chamber that is connected to the first working chamber via a first bore, and a second hydraulic chamber that is connected to the second working chamber via a second bore. A flow guiding element, which separates the two hydraulic chambers, guides the damping fluid flow to the first or second damping valve in response to a retraction or extension movement of the piston.

20 Claims, 5 Drawing Sheets

OSCILLATION DAMPER HAVING A BACKPACK VALVE

This application is a national stage of PCT International Application No. PCT/EP2009/002026, filed. Mar. 19, 2009, which claims priority under 35 U.S.C. §119 to German Patent Application No. 10 2008 015 412.1, filed Mar. 29, 2008, the entire disclosure of which is herein expressly incorporated by reference.

BACKGROUND AND SUMMARY OF THE INVENTION

The invention relates to an oscillation damper of the type having a working piston that is disposed in a damper tube that is at least partially filled with a damping liquid.

An oscillation damper of this general type is disclosed, for example, in European patent document EP 1 538 366 A1. In this known oscillation damper, two electromagnetic control valves are provided which are disposed hydraulically in parallel with the working piston, one which one has a flow passing through it only when the piston rod performs a retraction movement, with the other having a flow passing through it only when the piston rod performs an extension movement. The electromagnetic control valves are formed as so-called backpack valves; i.e., they are disposed in housings which are flanged to the damper tube of the oscillation damper.

The damping force can be continuously varied by the two electromagnetic control valves. In the case of the known oscillation damper, the damping forces can thus be continuously varied independently of each other in the traction stage and in the compression stage of the oscillation damper.

A disadvantage of this known oscillation damper is that each damping valve requires two connection bores in order to ensure the necessary inflow and outflow of the damping liquid. As a consequence, a total of four connection bores are to be introduced into the damper tube, which is complex in terms of manufacturing technology and causes the damper tube to weaken. Furthermore, in the known oscillation damper two independent housings are provided, wherein one damping valve is disposed in each housing. By arranging two damping valves in separate housings on the outer circumference of the damper tube, the oscillation damper requires on the whole a considerable amount of installation space which is not available in all vehicles to the chassis frame design engineers. The applicability of the known oscillation damper is thus restricted.

One object of the invention, therefore, is to provide an oscillation damper of the type described above, which obviates the described disadvantages.

This and other objects and advantages are achieved by the oscillation damper according to the invention, in which both damping valves are disposed in a common housing having a first and a second hydraulic chamber. The first hydraulic chamber is connected via a first bore to the working chamber remote from the piston rod and the second hydraulic chamber is connected via a second bore to the working chamber on the piston rod-side. A flow guiding element separates the two hydraulic chambers from one another, such that the damping liquid flowing into the first hydraulic chamber when the piston rod performs a retraction movement is supplied to the first damping valve in the valve through-flow direction, and the damping liquid flowing into the second hydraulic chamber when the piston rod performs an extension movement is supplied to the second damping valve in the valve through-flow direction.

The inventive arrangement of the damping valves in a single housing ensures that in comparison with the solution disclosed in European patent document EP 1 538 366 A1, a considerably smaller amount of installation space is required for the purpose of accommodating the oscillation damper. As a consequence, it is possible to utilize the oscillation damper according to the invention in vehicles in which oscillation dampers having only a single backpack valve have hitherto been used. In the case of vehicle chassis frames which provide only a small amount of installation space for the oscillation damper, the inventive arrangement of the two damping valves in a single housing can ensure a separate damping adjustment in the traction stage and in the compression stage of the oscillation damper in spite of the small installation space.

It is also advantageous that the oscillation damper in accordance with the invention requires only two connection bores to connect the housing to the damper tube inner space. Therefore, the inventive housing can be connected to the damper tube inner space merely via two connection bores because, due to the arrangement of the flow guiding element, during a retraction movement of the piston rod the first hydraulic chamber forms an inflow chamber and the second hydraulic chamber forms an outflow chamber for the damping liquid. In a similar manner, the arrangement of the flow guiding element ensures that during an extension movement of the piston rod the second hydraulic chamber forms an inflow chamber and the first hydraulic chamber forms an outflow chamber for the damping liquid. Therefore, with the oscillation damper in accordance with the invention, both hydraulic chambers can essentially be both the outflow chamber and also the inflow chamber, depending on the movement direction in which the piston rod and the working piston attached thereto move (traction direction or compression direction).

In accordance with the invention, the damping valves are formed preferably as electromagnetically operable, continuously adjustable control valves. The basic structure of damping valves of this type is already known from European patent document EP 1 538 366 A1 (above). The damping liquid must flow against these damping valves centrally in the middle. This central middle flow against the damping valves is ensured by means of the inventive flow guiding element for both valves, i.e., for both movement directions of the piston rod.

In the continuously adjustable damping valves, the damping force is generated by virtue of the fact that the hollow-cylindrical adjusting gate valve is displaced along its longitudinal axis on the cylindrical part of the deflection element, through which a flow can pass and with which the adjusting gate valve cooperates. By the axial displacement of the adjusting gate valve, a throttling opening disposed in the cylindrical part of the deflection element is revealed to a greater or lesser extent so that, depending upon the position of the adjusting gate valve, this throttle opening provides a certain degree of flow resistance for the damping liquid.

Basically, in the oscillation damper in accordance with the invention it is sufficient to provide only the continuously adjustable damping valves. However, in order to achieve damping which satisfies the requirements of driving comfort, it can be expedient to connect an additional passive valve element into the flow path in a hydraulic manner upstream of the active (adjustable) valve element which is formed by the adjusting gate valve and the cylindrical part of the deflection element. Depending upon the design of this additional passive valve element, the damping force progression can be influenced in a desired manner, and can be adapted e.g., to specific manufacturer specifications or wishes.

The flow guiding element can be produced essentially from different materials. Cost-effective production can be achieved if the flow guiding element is formed as a pressed sheet metal part or as a sintered component. However, it is also possible to produce the flow guiding element from synthetic material. In this case, the synthetic material injection molding method can be deployed for producing the flow guiding element.

In a preferred embodiment of the invention, the housing in which the damping valves are disposed is cylindrical. In this case, it is possible in a particularly simple manner to dispose the damping valves coaxially with respect to each other in the housing, and also the circular disk-shaped flow guiding element can be disposed conveniently, coaxial with respect to the damping valves and between same.

To permit installation of the entire arrangement of the two damping valves and the flow guiding element that is disposed therebetween, securely and firmly in the housing, the latter can comprise a shoulder which protrudes radially towards them and on which the flow guiding element is supported. In order to seal the first hydraulic chamber with respect to the second hydraulic chamber, a seal can be disposed in an advantageous manner between the radial shoulder of the housing and the flow guiding element. This seal can be formed as a simple 0-ring seal.

However, the radial shoulder can also alternatively be dispensed with and the flow guiding element can be sealed on its outer circumference against the cylindrical inner wall of the housing.

In accordance with the above-described embodiment of the invention, the sole objective of the flow guiding element is to supply the damping liquid to the respective damping valve, without a damping force being generated when a flow passes through the flow guiding element. However, in accordance with another embodiment of the invention, the flow guiding element is already equipped with pressure limiting valves which (as seen in the through-flow direction) are connected hydraulically upstream of the damping valves, which in turn are disposed hydraulically in parallel with the working piston. Therefore, the flow guiding element has a dual function: on the one hand it supplies the damping liquid to the respective damping valve, and on the other hand it actually generates a damping force which influences the damping characteristic. For this purpose, the flow guiding element comprises at least two channels to allow damping liquid to flow through, and the flow guiding element has pressure limiting valves disposed on it, wherein one pressure limiting valve can be influenced by damping liquid which flows through one channel and the other pressure limiting valve can be influenced by damping liquid which flows through the other channel. In a preferred manner, the pressure limiting valves disposed on the flow guiding element are formed as disk valves, in particular pretensioned disk valves.

In a preferred embodiment of the invention, each of the damping valves comprises a passive valve element in the form of a pressure limiting valve, and the additional pressure limiting valves which are disposed on the flow guiding element and generate a damping force are connected in a hydraulic manner upstream of these passive valve elements. Therefore, in the case of this embodiment two passive valve elements are each connected hydraulically in series one behind the other, in both through-flow directions. The two passive valve elements which are connected one behind the other in series preferably have different opening pressures.

In accordance with the invention, each of the first and the second damping valves comprises a non-return valve, to ensure that the damping liquid flows through the first damping valve only when the piston rod performs a retraction movement, and that the damping liquid flows through the second damping valve only when the piston rod performs an extension movement. In a preferred manner, each continuously adjustable damping valve comprises a passive valve element which in the valve through-flow direction is connected hydraulically upstream of the control valve, wherein as seen in the through-flow direction a non-return valve is connected hydraulically upstream of each passive element. These non-return valves can be formed as simple disk valves which do not generate any noteworthy damping force when a flow passes through them. By virtue of these non-return valves, the damping liquid is prevented from flowing through the damping valves in the respective undesired directions, when the control valves are open.

Other objects, advantages and novel features of the present invention will become apparent from the following detailed description of the invention when considered in conjunction with the accompanying drawings.

DETAILED DESCRIPTION OF THE INVENTION

Figure 1:
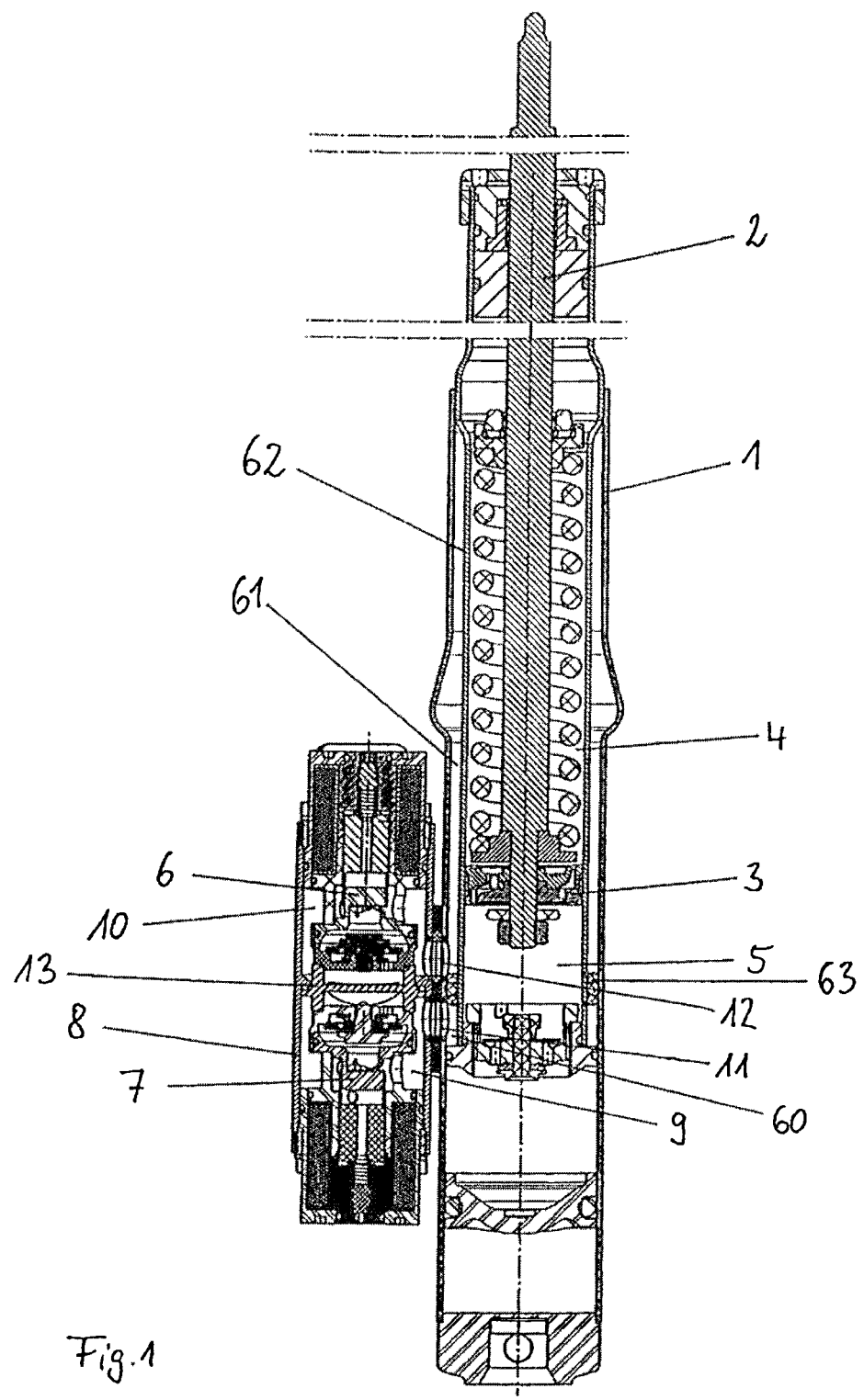
FIG. 1 is an axial sectional view of an oscillation damper in accordance with the invention.

FIG. 1 illustrates an inventive oscillation damper having a backpack valve which is attached to the damper tube 1, with a piston rod 2 which can be extended and retracted in an oscillating manner from/into the damper tube 1. Attached to one end of the piston rod 2 is a working piston 3 which divides the damper tube inner space into a working chamber 4 on the piston rod-side and a working chamber 5 remote from the piston rod. The backpack valve comprises a housing 8, into which two continuously adjustable damping valves 6, 7 are integrated. By means of these damping valves, the damping force of the oscillating damper in the traction stage and in the compression stage can be adjusted separately and independently of each other.

The damping valves 6, 7 are coupled together hydraulically by a flow deflection element 13. The precise mode of operation of the backpack valve in accordance with the invention is explained hereinafter.

The oscillation damper illustrated in FIG. 1 operates in accordance with the single chamber-operating principle. Therefore, a base valve is also provided below the working piston 3. However, the invention is also suitable for dampers which operate in accordance with the two chamber-operating principle.

When the piston rod performs a retraction movement, the damping liquid is supplied via the flow supply line 60, and when the piston rod performs an extension movement the damping liquid is supplied via the flow supply line 61. The flow supply lines 60, 61 are formed by a tube 62 which is inserted into the damper tube 1, and are sealed with respect to each other by a sealing element 63.

Figure 2:
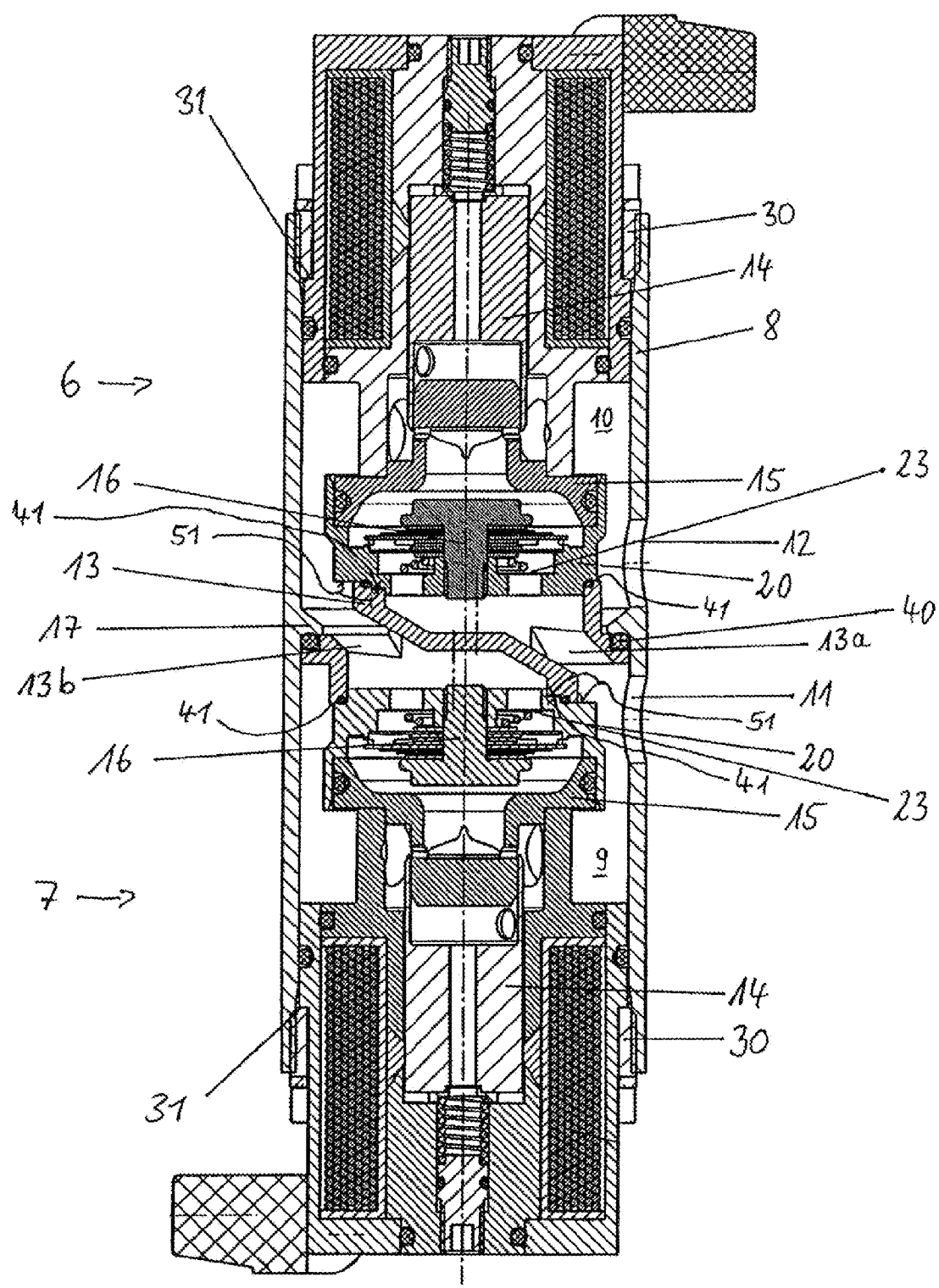
FIG. 2 is an axial sectional view of a backpack valve in accordance with a first embodiment of the invention.

FIG. 2 is an axial sectional view (rotated through 90° relative to FIG. 1) of a backpack valve in accordance with the invention. The housing 8, which is cylindrical, comprises two connection bores 11, 12, via which the hydraulic chambers 9, 10 are connected to the working chambers of the oscillation damper. The housing 8 comprises a radial shoulder 17, on which the flow guiding element 13 is supported. The flow guiding element 13 is braced between two valve bodies 20.

Disposed in the housing 8 are two damping valves 6, 7, which are identical in construction. In FIG. 2, the first damping valve 6 is disposed above the flow guiding element 13, and the second damping valve 7 is disposed below it. Each damping valve 6, 7 has an adjusting gate valve 14 which cooperates with the cylindrical part of a deflection element 15, through which a flow can pass. Provided in the outer cover of the cylindrical part of the deflection element 15 are one or more throttle openings which by means of the hollow-cylindrical part of the adjusting gate valve 14 can be completely closed, partially covered or completely revealed, depending upon which axial position the adjusting gate valve 14 assumes.

If the throttle openings are completely closed by the adjusting gate valve 14, then the damping liquid is not able to pass through the damping valves 6, 7 disposed in parallel with the working piston 3 of the oscillation damper. In this case, the damping force of the oscillation damper must be generated by the damping force-generating devices of the working piston 3. However, if the throttle openings are completely or partially revealed by the adjusting gate valve 14, then a damping force is generated when a flow passes through the throttle openings. The smaller the through-flow cross-section of the throttle openings, the greater the force which is generated.

The adjusting gate valve 14, which is continuously axially displaceable over a specified displacement path, by an electromagnetic drive device 60 in a manner known per se, is formed as an anchor. In this manner, it is possible to adjust each desired through-flow cross-section of the throttle openings and thus each desired damping force.

In accordance with the invention, it is provided that each of the first damping valve 6 and the second damping valve 7 comprises a non-return valve 23, which valves ensure that the damping liquid flows through the first damping valve 6 only when the piston rod 2 performs a retraction movement, and through the second damping valve 7 only when the piston rod 2 performs an extension movement. Each of the continuously adjustable damping valves 6, 7 comprises a passive valve element 16 which in the valve through-flow direction is connected hydraulically upstream of the respective control valves 14, 15, which as seen in the through-flow direction a non-return valve 23, are connected hydraulically upstream of the respective passive valve elements 16. These non-return valves 23, which can be formed as simple disk valves that do not generate any noteworthy damping force when a flow passes through them, prevent the damping liquid from flowing through the damping valves 6, 7 in the respectively undesired direction when the control valves 24 (adjusting gate valve 14, deflection element 15) are open.

The backpack valve in accordance with the invention operates as follows:

When the piston rod 2 performs a retraction movement (i.e., when the piston rod 2 is inserted into the damper tube 1), the working piston 3 urges damping liquid out of the working chamber 5, which is remote from the piston rod, via the bore 11 into the first hydraulic chamber 9. From this first hydraulic chamber 9, the damping liquid flows through a channel 13a of the flow guiding element 13. The damping liquid is supplied via the channel 13a to a passive damping element 16 of the first damping valve 6, which generates a damping force that is dependent upon the flow rate of the damping liquid. The damping liquid flows via the passive damping element 16 into a deflection element 15 of the first damping element 6. In the cylindrical part of the deflection element 15, on which the hollow-cylindrical part of the adjusting gate valve 14 is guided in an axial manner, the flow is deflected radially outwards. In so doing, the damping liquid flows through the through-flow cross-section of the throttle openings revealed by the adjusting gate valve 14 and enters into the second hydraulic chamber 10. The damping liquid then flows from the second hydraulic chamber 10 through the second bore 12 into the working chamber 4 on the piston rod-side.

When the piston rod 2 performs an extension movement, the working piston 3 urges damping liquid out of the working chamber 4 on the piston rod-side through the bore 12 into the second hydraulic chamber 10. From this second hydraulic chamber 10, the damping liquid flows through a channel 13b of the flow guiding element 13. The damping liquid is supplied via this channel 13b to a passive damping element 16 of the second damping element 7 which generates a damping force that is dependent upon the flow rate of the damping liquid. The damping liquid flows via the passive damping element 16 into a deflection element 15 of the second damping element 7.

In the cylindrical part of the deflection element 15, on which the hollow-cylindrical part of the adjusting gate valve 14 is guided in an axial manner, the flow is deflected radially outwards. In so doing, the damping liquid flows through the through-flow cross-section of the throttle openings revealed by the adjusting gate valve 14 and enters into the first hydraulic chamber 9. The damping liquid then flows from the first hydraulic chamber 9 through the first bore 11 into the working chamber 5 remote from the piston rod.

The flow deflection element 13 thus separates the two hydraulic chambers 9, 10 from one another in a hydraulic manner and, together with the channels 13a, 13b, ensures that said damping liquid flows correctly and centrally against the damping valves 6, 7.

In the illustrated exemplified embodiment, the flow deflection element 13 is formed 10 as a sintered component.

The entire arrangement consisting of the damping valves 6, 7 and the flow deflection element 13 is braced by means of two ring nuts 30. Each ring nut 30 comprises an external thread, by means of which it is screwed into a corresponding internal thread on the inner circumference of the housing 8. By means of a radial shoulder 31, the ring nuts 30 transfer a force, which is effective in the axial direction, to the respective damping valves 6, 7. In this manner, both damping valves 6, 7 are braced against the flow deflection element 13 by an axial clamping force.

A sealing element 40 is provided between the flow deflection element 13 and the radial shoulder 17 of the housing 8. This sealing element 40 is formed as a simple O-ring seal. Furthermore, the flow deflection element 13 comprises sealing surfaces 41 which are supported in a sealing manner against counter surfaces 51 of the valve bodies 20 of the damping valves 6, 7. The hydraulic chambers 9, 10 are hydraulically sealed with respect to each other by the sealing element 40 and the sealing surfaces 41 of the flow deflection element 13. Therefore, it is possible to ensure in a structurally convenient manner that the damping liquid flows separately and centrally against the correct damping valve 6, 7 when the piston rod 2 performs respective retraction and extension movements. Unlike in the case of connectable flow deflection elements which are also feasible, a malfunction is not possible by reason of the fact that the fixedly installed flow deflection element is used. In each movement state of the working piston 3 of the piston rod 2, the one-time mounted flow deflection element 13 ensures that the damping liquid flows correctly against the damping valve 6, 7 effective in the respective movement state.

Each valve element 16 comprises a non-return valve 23 which opens in the valve through-flow direction and closes in the opposite direction. These non-return valves ensure that a flow can pass through each damping valve 6, 7 only in a fixed through-flow direction. If the damping liquid flows e.g., through the connection bore 11 into the hydraulic chamber 9 and if the control valve 24, formed by the adjusting gate valve 14 and the deflection element 15, of the second damping valve 7 is open, then the non-return valve 23 allocated to the second damping valve 7 prevents the damping liquid from flowing through the damping valve 7 and ensures that it flows through the first damping valve 6 in the through-flow direction. The situation is similar if the damping liquid flows through the connection bore 12 into the hydraulic chamber 10. In this case, the non-return valve 23 which is allocated to the first damping valve 6 ensures the that said damping liquid flows correctly through the valve arrangement.

Figure 3:
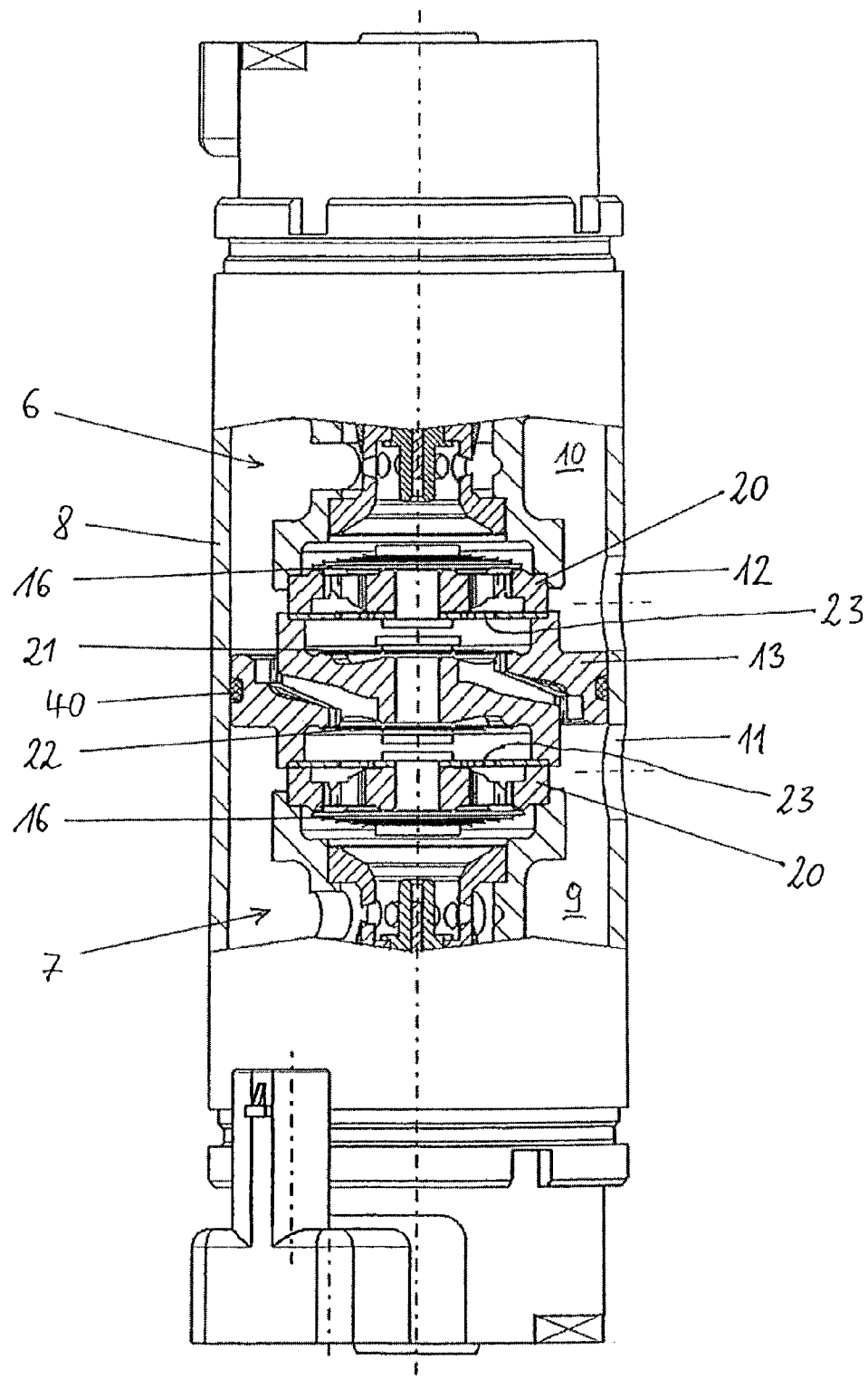
FIG. 3 is an axial sectional view of a backpack valve in accordance with a second embodiment of the invention.

In the embodiment illustrated in FIG. 2, the flow guiding element 13 ensures that the damping liquid is supplied to the damping valves 6, 7. In accordance with one embodiment of the invention as illustrated in FIG. 3, the flow guiding element 13 also has an additional function, namely to generate a damping force. In the embodiment illustrated in FIG. 3, the flow guiding element 13 comprises at least two channels 13a, 13b to allow damping liquid to flow through, and has pressure limiting valves 21, 22 disposed on it. One such pressure limiting valve 21 can be influenced by damping liquid flowing through one channel 13a, while the other can be influenced by damping liquid flowing through the other channel 13b. Therefore, connected upstream of the passive valve elements 16 of the damping valves 6, 7 are further passive valve elements in the form of the pressure limiting valves 21, 22 which are able to influence the progression of the damping force characteristic curves of the oscillation damper.

The respective passive pressure limiting valve 21, 22 disposed on the flow guiding element 13 is designed in such a manner that it opens at a lower pressure (i.e., at a lower flow rate of the damping liquid) than the passive valve element 16 located behind it (as seen in the through-flow direction). The pressure limiting valves thus serve to influence the damping force characteristic curves in a range of lower piston rod speeds, whereas the passive valve elements 16 serve to influence the damping force characteristic curves in the range of higher piston rod speeds.

In the embodiment shown in FIG. 2, the passive valve elements 16 are formed as two-stage, pretensioned pressure limiting valves. This has the disadvantage that that it is difficult to adjust the pretensioning of the valve disks of the second pressure limiting stage in an exact manner because the tolerances of the valve disks which lie one on top of the other and are disposed between the innermost support surface (which is also defined as the hub surface by the person skilled in the art) and the outermost support surface are added. Thus, there is the risk that the desired pretensioning force of the valve disks of the second pressure limiting curve is either not achieved or is exceeded. In both cases, this has a negative effect upon the intended influence of the damping characteristic curves.

A significant advantage of the embodiment shown in FIG. 3 over that shown in FIG. 2 is that the respective pretensioning gauge of the valve disks (i.e., the extent to which the valve disks are pretensioned) can be adjusted extremely precisely both for the pressure limiting valves 21, 22 and also for the pressure limiting valves 16. The pretensioning gauge is the level difference in the axial direction between the inner support surface and the outer support surface (also defined as the control edge by the person skilled in the art). Therefore, in the embodiment shown in FIG. 3, this pretensioning gauge can be adjusted extremely precisely because it can be generated directly during production of the flow guiding element 13 or during production of the valve bodies 20. If the flow guiding element 13 and the valve bodies 20 are formed as sintered components, then the pretensioning gauge is specified by the sintering tool. If the components are formed as sheet metal parts, then the pretensioning gauge is generated e.g., by a machining procedure (turning, milling). The valve disks of the second pressure limiting stage (i.e., the valve disks of the valve elements 16) are pretensioned directly between the inner and outer support surfaces. In other words, the inner support surface, on which the valve disk of the second pressure limiting stage is supported, is not formed by valve disks which lie one on top of the other (as in the case of the embodiment shown in FIG. 2), but rather is formed by the valve body 20 itself, so that the individual tolerances of the valve disk thicknesses are not additive, as mentioned above.

It is also an advantage of the embodiment shown in FIG. 3 that both the valve bodies 20 and the flow guiding element 13 can be produced cost-effectively as simple sintered components. Moreover, in the embodiment of the flow guiding element 13 illustrated in FIG. 3, the radial shoulder 17 of FIG. 2 can be dispensed with, so that a simple and more cost-effective tube can be used as the housing 8, and the hydraulic chambers 9, 10 are sealed with respect to one another by an 0-ring seal 40 which is disposed on the outer circumference of the flow guiding element 13 in a groove.

Figure 4:
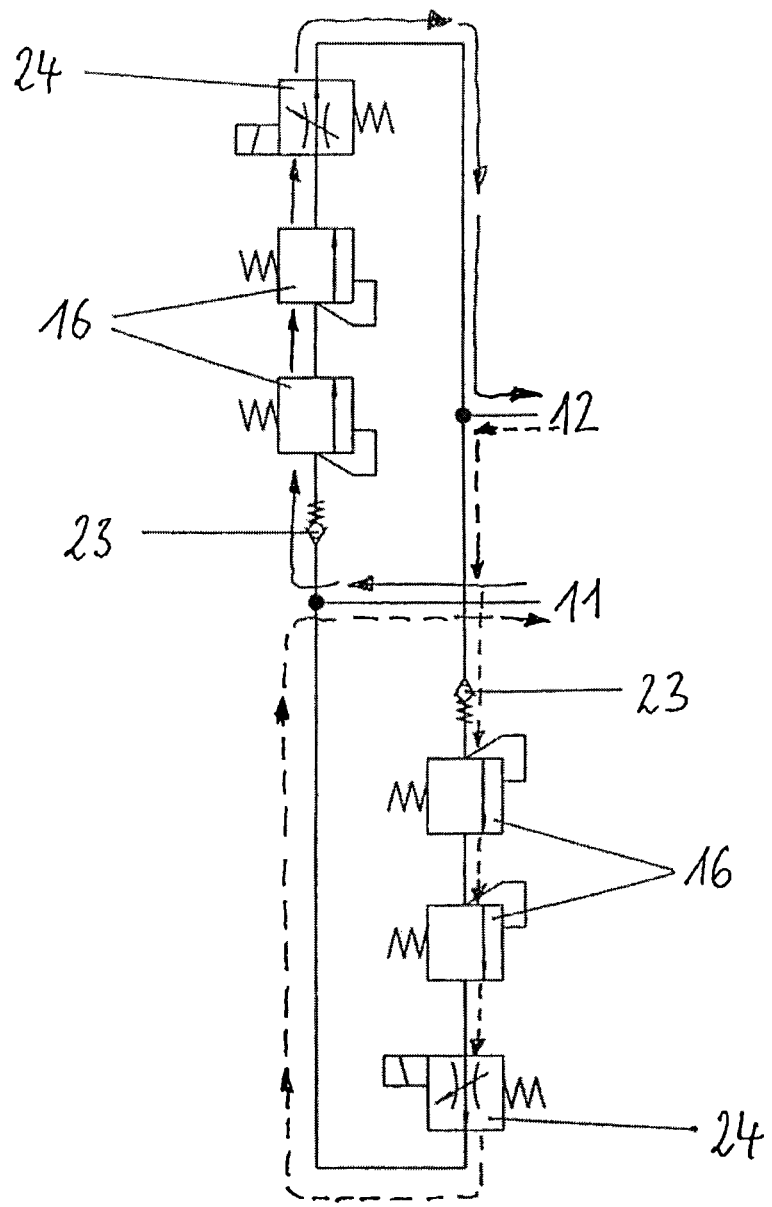
FIG. 4 shows an alternative hydraulic diagram of the inventive valve arrangement as shown in FIG. 2.

FIG. 4 illustrates an alternative hydraulic diagram of the inventive valve arrangement shown in FIG. 2. The connection bores 11, 12 are illustrated schematically. It is clearly evident that the non-return valves 23 ensure that a flow passes through each damping valve 6, 7 in only one through-flow direction. The through-flow direction for a retraction movement of the piston rod compression direction) is indicated by the solid arrows, whereas the through-flow direction for an extension movement of the piston rod (traction direction) is indicated by dashed arrows. The two-stage pressure limiting valve 16 is disposed downstream of the non-return valve 23 as seen in the respective through-flow direction and, in turn, is connected upstream of the continuously adjustable control valve 24.

Figure 5:
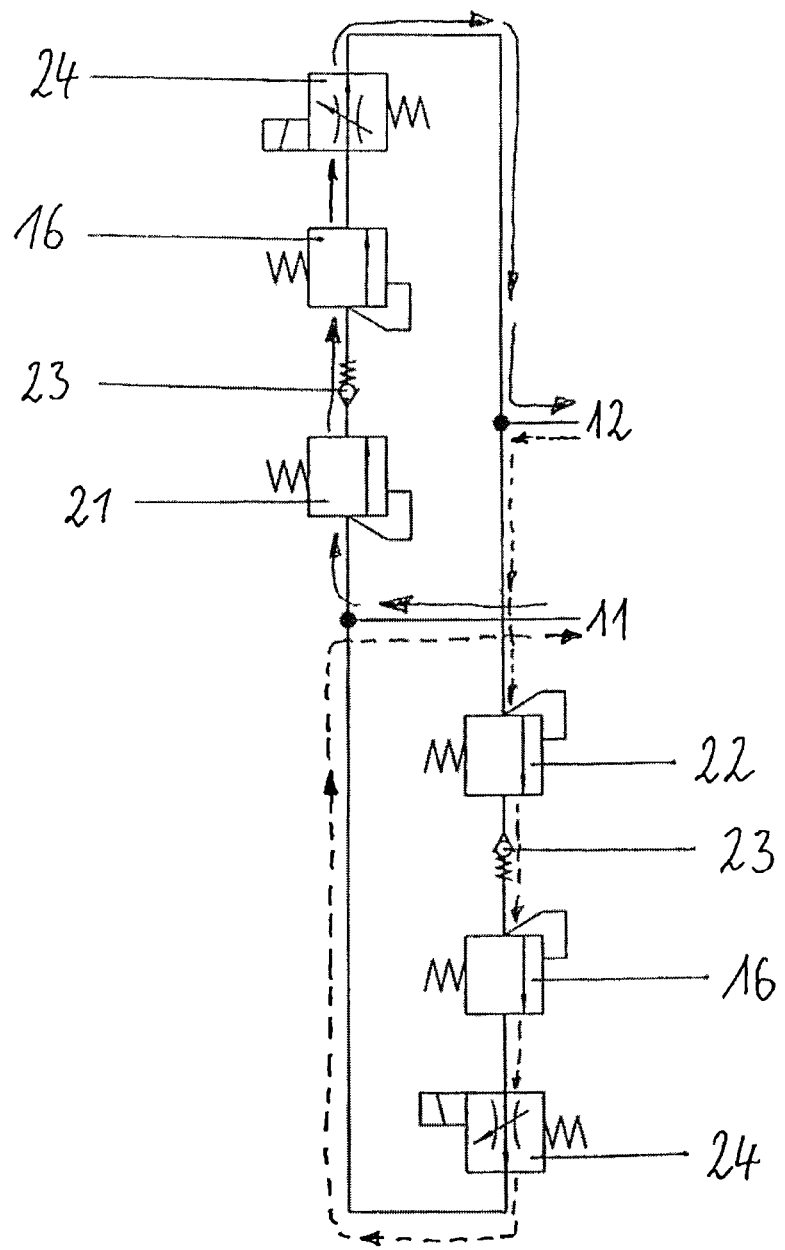
FIG. 5 is an alternative hydraulic diagram of the inventive valve arrangement as shown in FIG. 3.

FIG. 5 illustrates an alternative hydraulic diagram of the inventive valve arrangement shown in FIG. 3. As shown in FIG. 5, a first passive pressure limiting valve 21, 22 is connected upstream of the non-return valve 23 (seen in the through-flow direction). Disposed downstream of the non-return valve 23 is a second passive pressure limiting valve 16. The pressure limiting valves 21, 22 and 16 are formed as single-stage pressure limiting valves; that is, they open in each case at a single specifiable opening pressure. The continuously adjustable control valve 24 is disposed downstream of the second passive pressure limiting valve 16 (as seen in the through-flow direction).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A hydraulic oscillation damper, comprising:
    a damper tube which is filled at least partially with damping liquid;

a piston rod which can be extended from and retracted into the damper tube in an oscillating manner;
a working piston which is attached to the piston rod and divides the damper tube inner space into a first working chamber that is remote from the piston rod, and a second working chamber on the piston rod side;
first and second damping valves which are disposed hydraulically in parallel with the working piston, are attached to the damper tube and have a continuously adjustable damping force; wherein,
the damping liquid flows through the first damping valve only when the piston rod performs a retraction movement;
the damping liquid flows through the second damping valve only when the piston rod performs an extension movement;
both damping valves are disposed in a common housing having a first hydraulic chamber and a second hydraulic chamber;
the first hydraulic chamber is connected via a first bore to the first working chamber, and the second hydraulic chamber is connected via a second bore to second working chamber; and
a flow guiding element separates the two hydraulic chambers from one another, such that the damping liquid that flows into the first hydraulic chamber when the piston rod performs a retraction movement is supplied to the first damping valve in the valve through-flow direction, and the damping liquid that flows into the second hydraulic chamber when the piston rod performs an extension movement is supplied to the second damping valve in the valve through-flow direction.

2. A hydraulic oscillation damper, comprising:
a damper tube which is filled at least partially with damping liquid;
a piston rod which can be extended from and retracted into the damper tube in an oscillating manner;
a working piston which is attached to the piston rod and divides the damper tube inner space into a first working chamber that is remote from the piston rod, and a second working chamber on the piston rod side;
first and second damping valves which are disposed hydraulically in parallel with the working piston, are attached to the damper tube and have a continuously adjustable damping force; wherein,
the damping liquid flows through the first damping valve only when the piston rod performs a retraction movement;
the damping liquid flows through the second damping valve only when the piston rod performs an extension movement;
both damping valves are disposed in a common housing having a first hydraulic chamber and a second hydraulic chamber;
the first hydraulic chamber is connected via a first bore to the first working chamber, and the second hydraulic chamber is connected via a second bore to second working chamber;
a flow guiding element separates the two hydraulic chambers from one another, such that the damping liquid that flows into the first hydraulic chamber when the piston rod performs a retraction movement is supplied to the first damping valve in the valve through-flow direction, and the damping liquid that flows into the second hydraulic chamber when the piston rod performs an extension movement is supplied to the second damping valve in the valve through-flow direction;
the flow guiding element comprises at least two channels to allow the damping liquid to flow through; and
the flow guiding element has pressure limiting valves disposed on it, wherein one pressure limiting valve can be influenced by damping liquid flowing through one channel and the other pressure limiting valve can be influenced by damping liquid flowing through the other channel.

3. The oscillation damper as claimed in claim 2, wherein the damping valves comprise electromagnetically operable, continuously adjustable control valves.

4. The oscillation damper as claimed in claim 3, wherein the damping valves comprise hollow-cylindrical adjusting gate valves which are guided on a cylindrical part of a deflection element through which a flow can pass.

5. The oscillation damper as claimed in claim 2, wherein at least one of the damping valves comprises a passive valve element which, in the valve through-flow direction, is connected in a hydraulically manner upstream of the control valve.

6. The oscillation damper as claimed in claim 2, wherein the flow guiding element is formed as a sintered component.

7. The oscillation damper as claimed in claim 2, wherein the housing is cylindrical.

8. The oscillation damper as claimed in claim 2, wherein the damping valves are disposed coaxially relative to each other in the housing.

9. The oscillation damper as claimed in claim 2, wherein the flow guiding element is disposed coaxially relative to the damping valves, and between same.

10. The oscillation damper as claimed in claim 2, wherein the two damping valves are identical in construction.

11. The oscillation damper as claimed in claim 2, wherein the pressure limiting valves comprise disk valves.

12. The oscillation damper as claimed in claim 2, wherein:
each of the damping valves comprises a passive valve element; and
the pressure limiting valves are connected hydraulically upstream of the passive valve elements.

13. The oscillation damper as claimed in claim 2, wherein:
each damping valve comprises a passive valve element which, in the valve through-flow direction, is connected hydraulically upstream of the control valve; and
as seen in the through-flow direction, a non-return valve is connected hydraulically upstream of each valve element.

14. A hydraulic oscillation damper, comprising:
a damper tube which is filled at least partially with damping liquid;
a piston rod which can be extended from and retracted into the damper tube in an oscillating manner;
a working piston which is attached to the piston rod and divides the damper tube inner space into a first working chamber that is remote from the piston rod, and a second working chamber on the piston rod side;
first and second damping valves which are disposed hydraulically in parallel with the working piston, are attached to the damper tube and have a continuously adjustable damping force; wherein,
the damping liquid flows through the first damping valve only when the piston rod performs a retraction movement;
the damping liquid flows through the second damping valve only when the piston rod performs an extension movement;

both damping valves are disposed in a common housing having a first hydraulic chamber and a second hydraulic chamber;

the first hydraulic chamber is connected via a first bore to the first working chamber, and the second hydraulic chamber is connected via a second bore to second working chamber;

a flow guiding element separates the two hydraulic chambers from one another, such that the damping liquid that flows into the first hydraulic chamber when the piston rod performs a retraction movement is supplied to the first damping valve in the valve through-flow direction, and the damping liquid that flows into the second hydraulic chamber when the piston rod performs an extension movement is supplied to the second damping valve in the valve through-flow direction the damping valves and the flow guiding element are braced against one another in the housing; and two ring nuts are provided which are screwed to the housing and which comprise shoulders, by which clamping forces which are directed towards one another and effect bracing of the arrangement are transmitted in the axial direction to the damping valves.

15. The oscillation damper as claimed in claim 14, wherein the flow guiding element comprises at least two channels to allow the damping liquid to flow through; and the flow guiding element has pressure limiting valves disposed on it, wherein one pressure limiting valve can be influenced by damping liquid flowing through one channel and the other pressure limiting valve can be influenced by damping liquid flowing through the other channel.

16. The oscillation damper as claimed in claim 14, wherein the damping valves comprise electromagnetically operable, continuously adjustable control valves.

17. The oscillation damper as claimed in claim 16, wherein the damping valves comprise hollow-cylindrical adjusting gate valves which are guided on a cylindrical part of a deflection element through which a flow can pass.

18. The oscillation damper as claimed in claim 14, wherein at least one of the damping valves comprises a passive valve element which, in the valve through-flow direction, is connected in a hydraulically manner upstream of the control valve.

19. The oscillation damper as claimed in claim 14, wherein the damping valves are disposed coaxially relative to each other in the housing.

20. The oscillation damper as claimed in claim 14, wherein the flow guiding element is disposed coaxially relative to the damping valves, and between same.

* * * * *

UNITED STATES PATENT AND TRADEMARK OFFICE
CERTIFICATE OF CORRECTION

| | | |
|---|---|---|
| PATENT NO. | : 8,613,348 B2 | Page 1 of 1 |
| APPLICATION NO. | : 12/933656 | |
| DATED | : December 24, 2013 | |
| INVENTOR(S) | : Wolfgang Hamers and Andreas Krefeld | |

It is certified that error appears in the above-identified patent and that said Letters Patent is hereby corrected as shown below:

On the Title Page
Item (75) Second Inventor is "Andreas KREFELD"

Signed and Sealed this
First Day of July, 2014

Michelle K. Lee
*Deputy Director of the United States Patent and Trademark Office*